United States Patent
Li et al.

(10) Patent No.: US 10,261,351 B2
(45) Date of Patent: Apr. 16, 2019

(54) ALIGNMENT APPARATUS UTILIZING LASER

(71) Applicants: BOE Technology Group Co., Ltd., Beijing (CN); Hefei Xinsheng Optoelectronics Technology Co., Ltd., Anhui (CN)

(72) Inventors: Feng Li, Beijing (CN); Kai Wang, Beijing (CN)

(73) Assignees: BOE TECHNOLOGY GROUP CO., LTD., Beijing (CN); HEFEI XINSHENG OPTOELECTRONICS TECHNOLOGY CO., LTD., Anhui (CN)

(*) Notice: Subject to any disclaimer, the term of this patent is extended or adjusted under 35 U.S.C. 154(b) by 466 days.

(21) Appl. No.: 15/096,763

(22) Filed: Apr. 12, 2016

(65) Prior Publication Data

US 2017/0010486 A1 Jan. 12, 2017

(30) Foreign Application Priority Data

Jul. 9, 2015 (CN) .......................... 2015 1 0406196

(51) Int. Cl.
*G02F 1/1337* (2006.01)
*G02F 1/13* (2006.01)
(Continued)

(52) U.S. Cl.
CPC ...... *G02F 1/1303* (2013.01); *G02F 1/133784* (2013.01); *B29K 2105/256* (2013.01); *B29L 2009/005* (2013.01); *B29L 2011/00* (2013.01)

(58) Field of Classification Search
CPC .... G02F 1/133784; B05C 1/08; G01N 21/952
See application file for complete search history.

(56) References Cited

U.S. PATENT DOCUMENTS 5,221,981 A * 6/1993 Kodera ............. G02F 1/133784
349/126
5,315,421 A * 5/1994 Kurai ................. G02F 1/133784
349/126
(Continued)

FOREIGN PATENT DOCUMENTS

CN 1550831 A 12/2004
CN 104379079 2/2015
(Continued)

OTHER PUBLICATIONS

First Office Action, including Search Report, for Chinese Patent Application No. 201510406196.9, dated Jun. 2, 2017, 5 pages.

*Primary Examiner* — Karl Kurple
(74) *Attorney, Agent, or Firm* — Westman, Champlin & Koehler, P.A.

(57) ABSTRACT

An alignment apparatus includes a base, an alignment roller and a mounting frame, the alignment roller being attached with an alignment rubbing cloth, the mounting frame having two mounting portions for mounting one of two ends of alignment roller, respectively. The alignment apparatus further includes: at least one laser emitting unit disposed on a mounting portion where one end of alignment roller is located, light rays emitted from each laser emitting unit being distant from axis of alignment roller by preset distance; at least one laser blocking unit corresponding to at least one laser emitting unit, respectively, and disposed on a mounting portion where the other end of alignment roller is located; a controller in a signal connection with each laser emitting unit and configured for controlling a part or all of the laser emitting units to be activated while alignment roller is performing rubbing alignment on a surface of the substrate.

18 Claims, 3 Drawing Sheets

(51) Int. Cl.
*B29K 105/00* (2006.01)
*B29L 11/00* (2006.01)
*B29L 9/00* (2006.01)

(56) References Cited

U.S. PATENT DOCUMENTS

| | | | | |
|---|---|---|---|---|
| 5,406,397 | A * | 4/1995 | Kodera | G02F 1/133784 349/126 |
| 5,668,615 | A * | 9/1997 | Miyata | G02F 1/13378 349/126 |
| 6,313,897 | B1 * | 11/2001 | Murayama | G02F 1/133784 349/123 |
| 6,567,720 | B1 * | 5/2003 | Figiel | G01N 33/346 162/198 |
| 7,300,692 | B2 | 11/2007 | Hirota et al. | |
| 7,471,380 | B2 * | 12/2008 | Kishioka | G01N 21/21 349/191 |
| 7,525,619 | B2 * | 4/2009 | Cho | G02F 1/1303 15/230 |
| 2002/0131000 | A1 * | 9/2002 | Koike | G02F 1/133784 349/126 |
| 2005/0067042 | A1 | 3/2005 | Hirota et al. | |
| 2006/0280879 | A1 * | 12/2006 | Park | G02F 1/133788 428/1.1 |
| 2007/0153181 | A1 * | 7/2007 | Song | G02F 1/1303 349/124 |
| 2008/0002196 | A1 * | 1/2008 | Yoo | G01N 21/8983 356/238.1 |
| 2010/0150687 | A1 * | 6/2010 | Sakata | H01L 21/6719 414/222.07 |
| 2015/0298254 | A1 | 10/2015 | Varghese et al. | |
| 2016/0132281 | A1 * | 5/2016 | Yamazaki | G06F 3/1446 345/1.3 |

FOREIGN PATENT DOCUMENTS

| | | | | |
|---|---|---|---|---|
| CN | 104570490 | | 4/2015 | |
| KR | 20020088203 | | 11/2002 | |
| KR | 20100078253 | A * | 7/2010 | G02F 1/1337 |
| KR | 20110073013 | | 6/2011 | |
| TW | 2004-735191 | * | 10/2004 | G01B 11/02 |

* cited by examiner (The Prior Art)

ALIGNMENT APPARATUS UTILIZING LASER

CROSS-REFERENCE TO RELATED APPLICATION

This application claims the benefit of Chinese Patent Application No. 201510406196.9 filed on Jul. 9, 2015 in the State Intellectual Property Office of China, the whole disclosure of which is incorporated herein by reference.

BACKGROUND OF THE INVENTION

Field of the Invention

Embodiments of the present disclosure relate to a technical field of liquid crystal display preparing process, and particularly relate to an alignment apparatus.

Description of the Related Art

Currently, an array substrate and a color film substrate are required to be coated with a layer of alignment film (polyimide film, i.e. PI film) on their surfaces before they are assembled with each other to form a liquid crystal panel. An alignment apparatus is adopted to form grooves with a certain orientation in a surface of the alignment film through rubbing, the grooves oriented in sequence cause liquid crystal molecules to be obliquely directionally arranged with a certain pretilt angle in the same direction.

During a manufacturing process of a liquid crystal display device, taking an array substrate for instance, a plurality of array substrates are generally provided on a large glass substrate, a conventional alignment process is illustrated in FIG. 1. An alignment roller 02 of an alignment apparatus is in a circular shape and can be rotated around a central axis by a motor while the glass substrate moves relative to the alignment roller in a direction of an arrow as shown in FIG. 1, alignment piles 021 of an alignment rubbing cloth on the alignment roller 02 will contact with the glass substrate coated with the alignment film. As the glass substrate moves relative to the alignment roller 02, a friction force will be generated between the alignment piles 021 and the glass substrate, so that the alignment grooves may be formed in the substrate 01 under an effect of the friction between the alignment piles 021 on the alignment roller 02 and the substrate 01.

However, during the rubbing alignment by the alignment roller of the existing alignment apparatus, as the array/color film substrate coated with the alignment film is subjected to a rubbing alignment process by the alignment rubbing cloth, the alignment rubbing cloth will be stretched as a result of an effect of force. Further, as the alignment rubbing cloth is subjected to a non-uniform force due to differences in height between segments in the array/color film substrate, the alignment piles in different regions of the alignment rubbing cloth will be subjected to different stretched strengths, which tends to cause lengths of the alignment piles of the alignment rubbing cloth to be non-uniform, thereby reducing an alignment effect.

SUMMARY OF THE INVENTION

Embodiments of the present disclosure provide an alignment apparatus which is capable of improving uniformity of the lengths of the alignment piles of the alignment rubbing cloth so as to improve uniformity of the alignment process.

In order to achieve the above purposes, the present disclosure provides the following technical solutions:

An alignment apparatus, comprising a base, an alignment roller and a mounting frame for pivotally mounting the alignment roller, the base having a supporting surface for supporting a substrate, the alignment roller being attached with an alignment rubbing cloth, the mounting frame having two mounting portions which are used for mounting two ends of the alignment roller, respectively, wherein the alignment apparatus further comprises:

at least one laser emitting unit which is disposed on a mounting portion where one end of two ends of the alignment roller is located, light rays emitted from each laser emitting unit being distant from an axis of the alignment roller by a preset distance;

at least one laser blocking unit which corresponds to the at least one laser emitting unit, respectively, and is disposed on a mounting portion where the other end of two ends of the alignment roller is located;

a controller which is in a signal connection with each laser emitting unit and is configured for controlling a part or all of the laser emitting units to be activated while the alignment roller is performing a rubbing alignment on a surface of the substrate.

In the alignment apparatus according to the embodiment of the present disclosure, during the alignment, the laser emitting unit is controlled to be activated by the controller, then lengths of piles of the alignment roller is controlled by utilizing the preset distance between the light rays emitted from the laser emitting unit and the axis of the alignment roller, specifically, the piles will be cut off at locations where they intersect with the light rays emitted from the laser emitting unit, so as to ensure the piles of the alignment roller have an uniform length, thereby ensuring the uniformity of the alignment process.

In some optional implementations, the base is movable back and forth in a horizontal direction, and the movement direction of the base is perpendicular to the axis of the alignment roller.

In some optional implementations, there are two laser emitting units which are disposed separately in the movement direction of the base.

In some optional implementations, the alignment apparatus further comprises a detecting unit which is in a signal connection with the controller and is configured for detecting the movement direction of the base; wherein the controller is further configured to activate the laser emitting unit in the front of the axis of the alignment roller in the movement direction of the base according to information associated with the received movement direction of the base, thereby reducing or avoiding scurf generated when the piles of the alignment rubbing cloth wrapped on the alignment roller are cut off from dropping into a region of the alignment film on the array substrate or on the color film substrate, which has been subjected to the rubbing process, further improving the uniformity of the alignment process and thus improving the product quality.

In some optional implementations, the detecting unit is a displacement sensor.

In some optional implementations, the preset distance between the light rays emitted from each laser emitting unit and the axis of the alignment roller is adjustable. As the alignment rubbing cloth on the alignment apparatus is replaceable, the preset distance between the light rays emitted from each laser emitting unit and the axis of the alignment roller is set to be adjustable, so that the lengths of the piles on the alignment roller may also be adjustable, correspondingly, depths of the grooves aligned by the alignment roller may also be adjustable, thereby enlarging a usage range of the alignment apparatus.

In some optional implementations, each laser emitting unit is secured on the corresponding mounting portion through a screw or a bolt.

In some optional implementations, the mounting frame is provided with sliding slots corresponding to the respective laser emitting units on the mounting portion where the laser emitting units are mounted, and the laser emitting units are provided with sliders mating with the respective sliding slots. It may be convenient to adjust the preset distance between the light rays emitted from each laser emitting unit and the axis of the alignment roller by moving the slider in the sliding slot, so as to realize an adjustment of the lengths of the piles of the alignment roller.

In some optional implementations, the mounting frame is provided with sliders corresponding to the respective laser emitting units on the mounting portion where the laser emitting units are mounted, and the laser emitting units are provided with sliding slots mating with the respective sliders. It may be convenient to adjust the preset distance between the light rays emitted from each laser emitting unit and the axis of the alignment roller by moving the slider in the sliding slot, so as to realize an adjustment of the lengths of the piles of the alignment roller.

In some optional implementations, the controller is a programmable controller.

In some optional implementations, the alignment apparatus further comprises a laser cutting device for cutting off piles of the alignment rubbing cloth.

In some optional implementations, the laser cutting device comprises a laser emitter disposed on the mounting portion where the laser emitting unit is disposed and a laser blocker disposed on the mounting portion where the laser blocking unit is disposed.

In some optional implementations, the laser blocker and the laser blocking unit are formed into one piece.

In some optional implementations, a power of the laser emitter is higher than a power of the laser emitting unit.

Figure 1:
FIG. 1 is a schematic view of an alignment roller in the prior art.

| Lists of reference numerals: | | | |
| --- | --- | --- | --- |
| 01 | substrate | 02 | alignment roller |
| 021 | alignment pile | 1 | base |
| 2 | substrate | 3 | alignment roller |
| 31 | axis | 4 | laser emitting unit |
| 41 | light ray | 5 | laser blocking unit |
| 6 | controller | 7 | detecting unit |
| 9 | mounting frame | 8 | alignment film |
| 10 | laser emitter | L | preset distance |

DETAILED DESCRIPTION OF PREFERRED EMBODIMENTS OF THE INVENTION

Hereinafter, technical solutions in the embodiments of the present disclosure will be described clearly and completely with reference to the accompanying drawings in the embodiments of the present disclosure. It is obvious that the described embodiments are merely a part of the embodiments, rather than all the embodiments.

Figure 2:
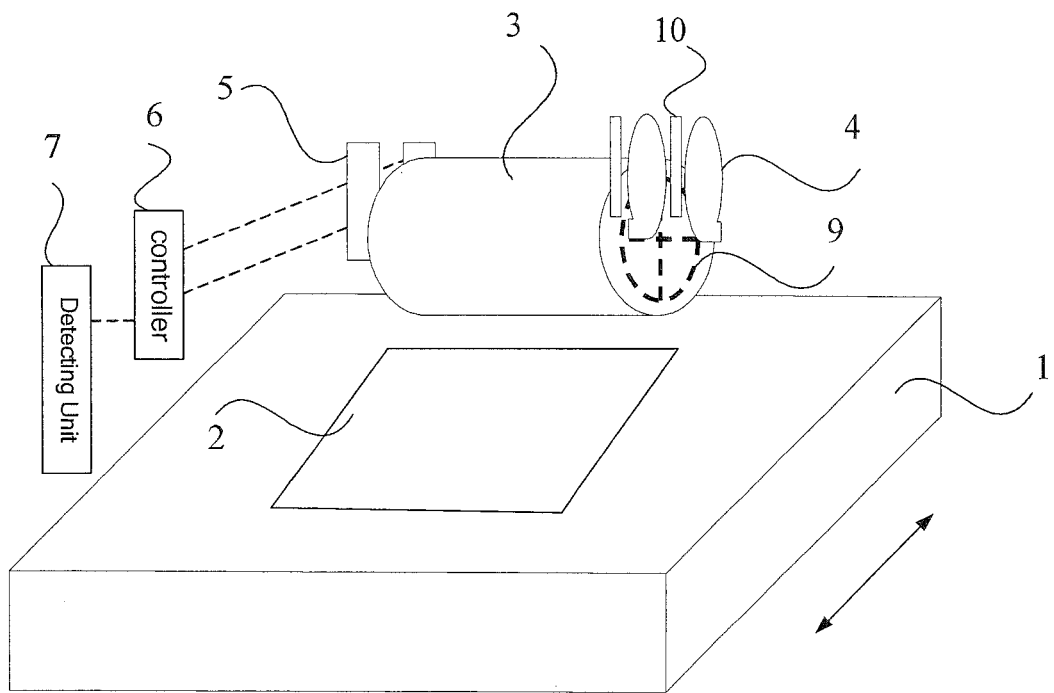
FIG. 2 is a schematic perspective view of an alignment apparatus according to an embodiment of the present disclosure.
Figure 3:
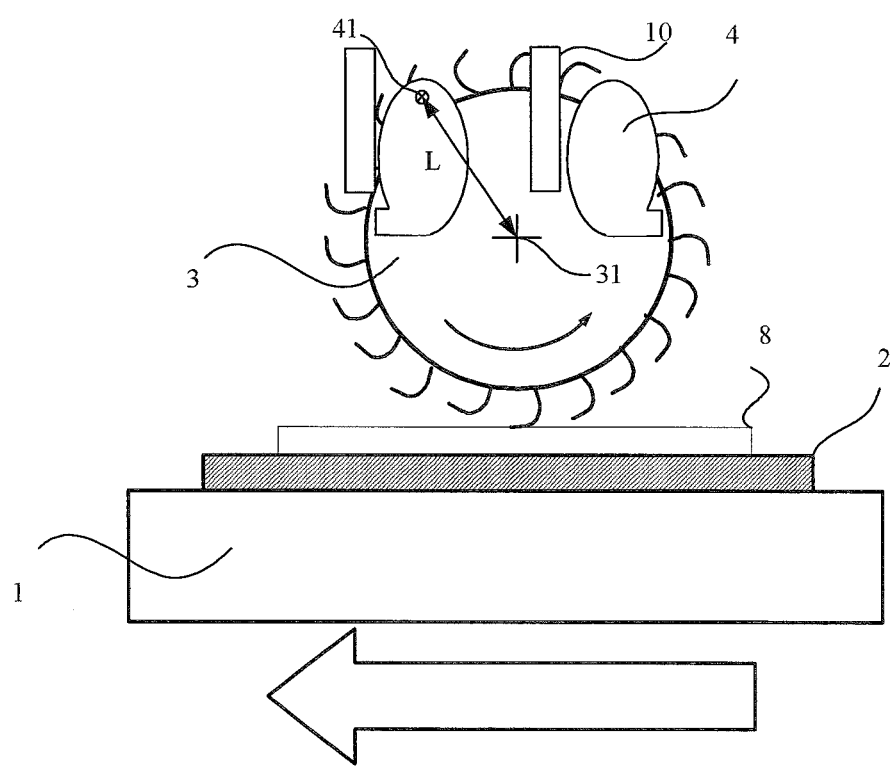
FIG. 3 is a schematic side view of an alignment apparatus according to an embodiment of the present disclosure.

As shown in FIGS. 2 and 3, FIG. 2 is a schematic perspective view of an alignment apparatus according to an embodiment of the present disclosure, and FIG. 3 is a schematic side view of an alignment apparatus according to an embodiment of the present disclosure. The alignment apparatus comprises a base 1, an alignment roller 3 and a mounting frame 9 for pivotally mounting the alignment roller 3. The base 1 has a supporting surface for supporting a substrate 2, the alignment roller 3 is attached with an alignment rubbing cloth, the mounting frame 9 has two mounting portions which are used for mounting two ends of the alignment roller 3, respectively. The alignment apparatus further comprises:

at least one laser emitting unit 4 which is disposed on a mounting portion where one end of two ends of the alignment roller 3 is located, light rays emitted from each laser emitting unit 4 is distant from an axis 31 of the alignment roller 3 by a preset distance L, as shown in FIG. 3;

at least one laser blocking unit 5 which corresponds to the at least one laser emitting unit 4, respectively and is disposed on a mounting portion where the other end of two ends of the alignment roller 3 is located;

a controller which is in a signal connection with each laser emitting unit 4 and is configured for controlling a part or all of the laser emitting units 4 to be activated while the alignment roller 3 is performing a rubbing alignment on a surface of the substrate 2.

In the alignment apparatus according to the embodiment of the present disclosure, during the alignment, the laser emitting unit 4 is controlled to be activated by the controller 6, then lengths of piles of the alignment roller 3 is controlled by utilizing the preset distance between the light rays emitted from the laser emitting unit 4 and the axis of the alignment roller 3, specifically, the piles will be cut off at locations where they intersect with the light rays emitted from the laser emitting unit 4, so as to ensure the piles of the alignment roller 3 have an uniform length, thereby ensuring the uniformity of the alignment process. Specifically, the locations where the piles of the alignment roller 3 intersect with the light rays emitted from the laser emitting unit 4 indicate locations where the piles are to be cut off, then the piles may be cut off in various ways, for example, be cut off manually or automatically, a cutting device for cutting off the piles will be further described hereinafter.

It should be noted that mounting positions of the laser emitting units are required to be calibrated before the above alignment apparatus is used, and the calibration is implemented in accordance with the following principle: laser beams emitted from the laser emitting unit intersect with the piles of the alignment roller, as long as distances between intersecting points where the laser beams emitted from the laser emitting unit intersect with the piles of the alignment roller and the axis of the alignment roller in a direction perpendicular to the supporting surface is just the preset distance, a requirement that the lengths of the piles of the alignment roller is required to be cut off will be met.

In a particular embodiment, the alignment apparatus further comprises a laser cutting device for cutting off the piles of the alignment roller 3. As shown in FIG. 2, the laser cutting device comprises a laser emitter 10 configured to emit laser beams for cutting off the piles of the alignment roller 3 and a laser blocker configured for receiving the laser beams emitted from the laser emitter. The laser emitter may be disposed on the mounting portion where the laser emitting unit 4 is mounted. The laser blocker may be disposed on the mounting portion where the laser blocking unit 5 is mounted, or the laser blocker may be integrated with the laser blocking unit 5, that is, the laser blocking unit 5 can be used to receive both the laser beams emitted from the laser emitting unit 4 and the laser beams emitted from the laser emitter. Also, a power of the laser emitter is higher than a power of the laser emitting unit 4.

In a particular embodiment, in order to facilitate the alignment on the alignment film on the substrate, the base 1 is movable back and forth in a horizontal direction (indicated by an arrow in FIG. 2), which is perpendicular to the axis of the alignment roller 3.

In a particular embodiment, there are two laser emitting units 4 disposed separately in the movement direction of the base 1, that is, it is preferable that there is a distance between the two laser emitting units.

Further, in order to facilitate controlling the number and positions of activated laser emitting units 4, the alignment apparatus may also comprise a detecting unit 7 which is in a signal connection with the controller 6 and is configured for detecting the movement direction of the base 1. The controller 6 may be further configured to activate the laser emitting unit 4 in the front of the axis of the alignment roller in the movement direction of the base 1 according to information associated with the received movement direction of the base 1. FIG. 3 is a schematic side view of the alignment apparatus according to an embodiment of the present disclosure, as shown in FIG. 3, when the alignment roller 3 performs the rubbing alignment on the alignment film 8 on the substrate 2 as the base 1 moves in a direction indicated by an arrow as shown in FIG. 3, the controller is required to control the laser emitting unit 4 at left side (as shown in FIG. 3) to be activated, thereby reducing or avoiding scurf generated when the piles of the alignment rubbing cloth wrapped on the alignment roller 3 are cut off from dropping into a region of the alignment film on the array substrate or on the color film substrate, which has been subjected to the rubbing process, further improving the uniformity of the alignment process and thus improving the product quality.

Optionally, the above detecting unit 7 may be a displacement sensor. Of course, the detecting unit 7 is not limited to the displacement sensor, and may also be other devices, which are omitted here.

In a preferable embodiment, the preset distance between the light rays emitted from each laser emitting unit 4 and the axis of the alignment roller 3 is adjustable. As the alignment rubbing cloth on the alignment apparatus is replaceable, the preset distance between the light rays 41 emitted from each laser emitting unit 4 and the axis 31 of the alignment roller 3 is set to be adjustable, so that the lengths of the piles on the alignment roller 3 may also be adjustable, correspondingly, depths of the grooves aligned by the alignment roller may also be adjustable, thereby enlarging a usage range of the alignment apparatus.

Each of the above laser emitting units 4 may be secured on the corresponding mounting portion through a screw or a bolt. Of course, each of the laser emitting units may also be mounted through other manners, which are not limited to the above listed manners.

Figure 4A:
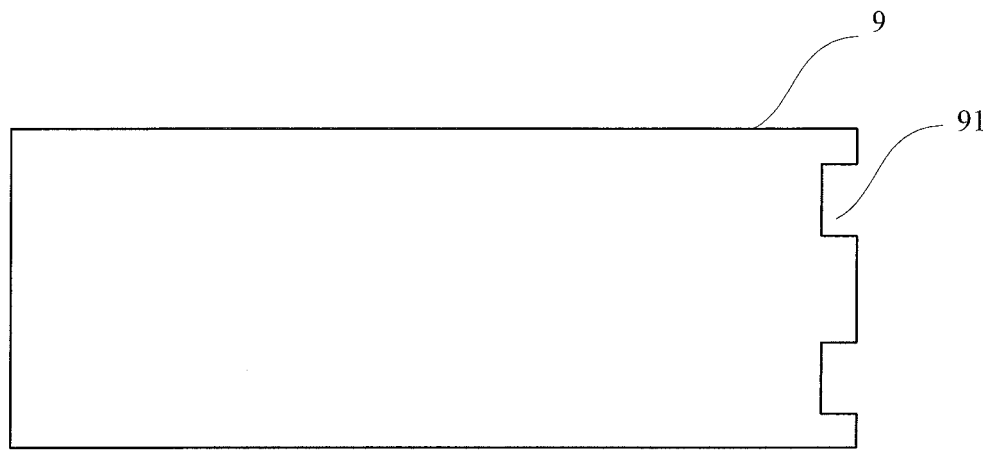
FIG. 4A and FIG. 4B are schematic top views showing a mounting frame of an alignment apparatus according to an embodiment of the present disclosure, in which the mounting frame has sliding slots and sliders respectively.
Figure 4B:
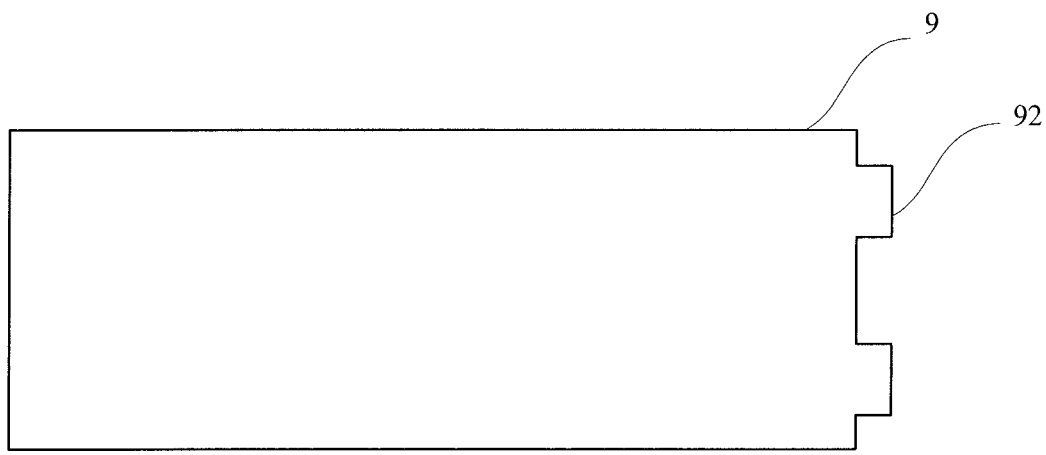

Setting the preset distance between the light rays 41 emitted from each laser emitting unit 4 and the axis 31 of the alignment roller 3 to be adjustable may be realized through various structures. In some implementations, the mounting frame 9 is provided with sliding slots 91 (as shown in FIG. 4A) corresponding to the respective laser emitting units 4 on the mounting portions where the laser emitting units 4 are mounted, and the laser emitting units 4 are provided with sliders mating with the respective sliding slots. It may be convenient to adjust the preset distance between the light rays emitted from each laser emitting unit and the axis of the alignment roller by moving the slider in the sliding slot, so as to realize an adjustment of the length of the piles of the alignment roller. While adjusting the preset distance between the light rays emitted from each laser emitting unit and the axis of the alignment roller, the laser emitting unit may be moved in a direction perpendicular to the base 1, and/or may be moved in a direction which is parallel to the base and is perpendicular to the axis of the alignment roller. In other implementations, the mounting frame 9 is provided with sliders 92 (as shown in FIG. 4B) corresponding to the respective laser emitting units 4 on the mounting portions where the laser emitting units 4 are mounted, and the laser emitting units 4 are provided with sliding slots mating with the respective sliders. It may be convenient to adjust the preset distance between the light rays emitted from each laser emitting unit and the axis of the alignment roller by moving the slider in the sliding slot, so as to realize an adjustment of the lengths of the piles of the alignment roller. Similarly, while adjusting the preset distance between the light rays emitted from each laser emitting unit and the axis of the alignment roller, the laser emitting unit may be moved in a direction perpendicular to the base 1, and/or may be moved in a direction which is parallel to the base and is perpendicular to the axis of the alignment roller.

Optionally, the above controller may be a programmable controller.

Obviously, various modifications and changes may be made to the embodiments of the present invention by those skilled in the art without departing from the spirit and scope of the present invention. As such, these modifications and changes are intended to be included in the present invention if they fall into the scope of the appended claims of the present invention and the equivalents thereof.

What is claimed is:

1. An alignment apparatus, comprising a base, an alignment roller and a mounting frame for pivotally mounting the alignment roller, the base having a supporting surface for supporting a substrate, the alignment roller being attached with an alignment rubbing cloth, the mounting frame having two mounting portions which are used for mounting two ends of the alignment roller, respectively, wherein the alignment apparatus further comprises:

at least one laser emitting unit which is disposed on the mounting portion where one end of two ends of the alignment roller is located, light rays emitted from each laser emitting unit being distant from an axis of the alignment roller by a preset distance;

at least one laser blocking unit which corresponds to the at least one laser emitting unit, respectively, and is disposed on the mounting portion where the other end of two ends of the alignment roller is located;

a controller which is in a signal connection with each laser emitting unit and is configured for controlling a part or all of the laser emitting units to be activated while the alignment roller is performing a rubbing alignment on a surface of the substrate; and a laser cutting device for cutting off piles of the alignment rubbing cloth,
wherein the laser cutting device comprises a laser emitter disposed on the mounting portion where the laser emitting unit is disposed and a laser blocker disposed on the mounting portion where the laser blocking unit is disposed.

2. The alignment apparatus according to claim 1, wherein the base is movable back and forth in a horizontal direction, and a movement direction of the base is perpendicular to the axis of the alignment roller.

3. The alignment apparatus according to claim 2, wherein there are two laser emitting units which are disposed separately in the movement direction of the base.

4. The alignment apparatus according to claim 2, further comprising a detecting unit which is in a signal connection with the controller and is configured for detecting the movement direction of the base; wherein the controller is further configured to activate a laser emitting unit of the at least one laser emitting unit in front of the axis of the alignment roller in the movement direction of the base according to information associated with a received movement direction of the base.

5. The alignment apparatus according to claim 3, further comprising a detecting unit which is in a signal connection with the controller and is configured for detecting the movement direction of the base; wherein the controller is further configured to activate a laser emitting unit of the two laser emitting units in front of the axis of the alignment roller in the movement direction of the base according to information associated with a received movement direction of the base.

6. The alignment apparatus according to claim 4, wherein the detecting unit is a displacement sensor.

7. The alignment apparatus according to claim 5, wherein the detecting unit is a displacement sensor.

8. The alignment apparatus according to claim 1, wherein the preset distance between the light rays emitted from each laser emitting unit and the axis of the alignment roller is adjustable.

9. The alignment apparatus according to claim 8, wherein each laser emitting unit is secured on the corresponding mounting portion through a screw or a bolt.

10. The alignment apparatus according to claim 8, wherein the mounting frame is provided with sliding slots corresponding to the respective laser emitting units on the mounting portion where the laser emitting units are mounted, and the laser emitting units are provided with sliders mating with the respective sliding slots.

11. The alignment apparatus according to claim 8, wherein the mounting frame is provided with sliders corresponding to the respective laser emitting units on the mounting portion where the laser emitting units are mounted, and the laser emitting units are provided with sliding slots mating with the respective sliders.

12. The alignment apparatus according to claim 1, wherein the controller is a programmable controller.

13. The alignment apparatus according to claim 1, wherein the laser blocker and the laser blocking unit are formed into one piece.

14. The alignment apparatus according to claim 1, wherein a power of the laser emitter is higher than a power of the laser emitting unit.

15. The alignment apparatus according to claim 2, wherein the preset distance between the light rays emitted from each laser emitting unit and the axis of the alignment roller is adjustable.

16. The alignment apparatus according to claim 3, wherein the preset distance between the light rays emitted from each laser emitting unit and the axis of the alignment roller is adjustable.

17. The alignment apparatus according to claim 4, wherein the preset distance between the light rays emitted from each laser emitting unit and the axis of the alignment roller is adjustable.

18. The alignment apparatus according to claim 5, wherein the preset distance between the light rays emitted from each laser emitting unit and the axis of the alignment roller is adjustable.

* * * * *